Nov. 10, 1953     A. A. ROBILLARD     2,658,938
ACCUMULATOR BATTERY
Filed July 21, 1952     2 Sheets-Sheet 1
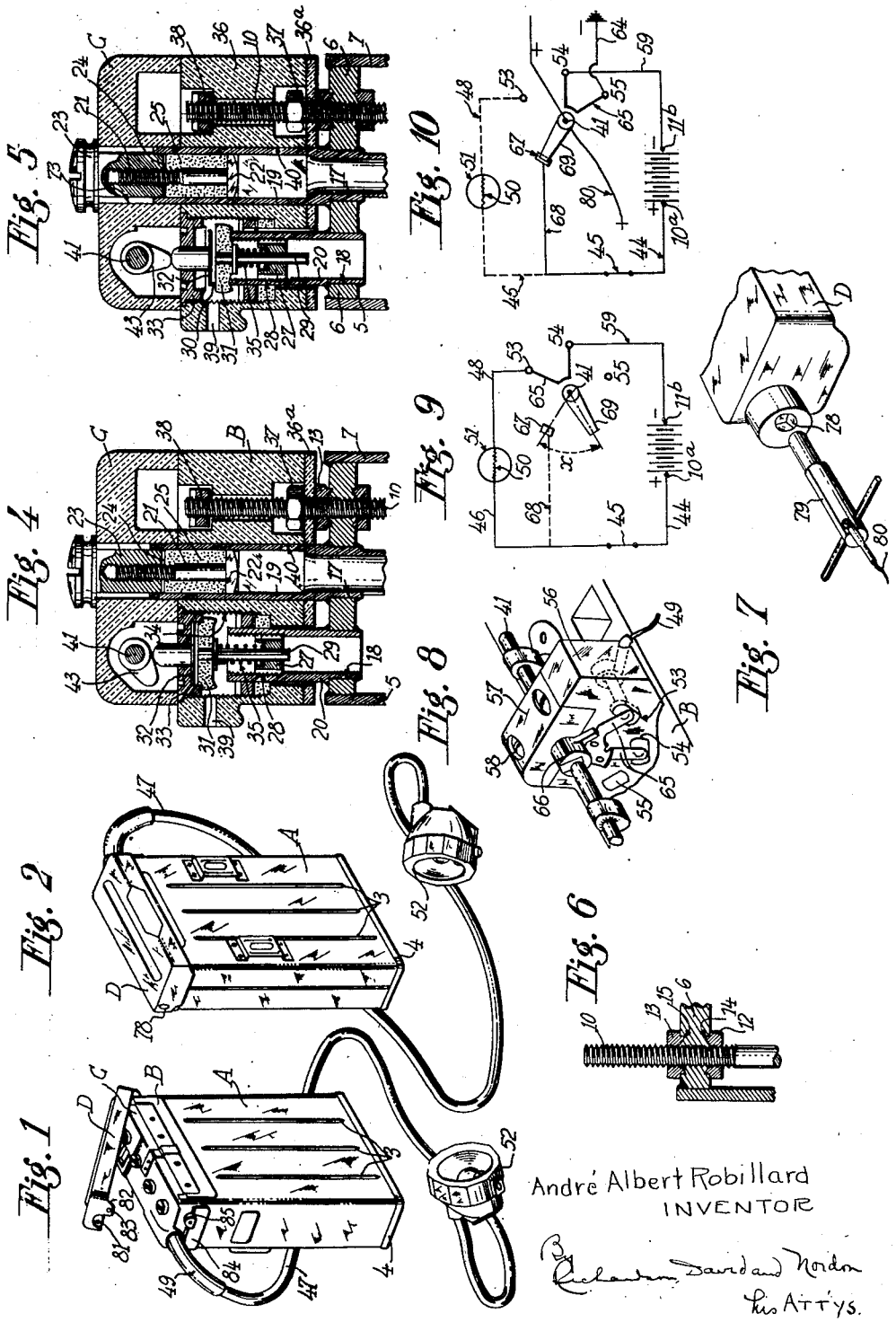
André Albert Robillard
INVENTOR

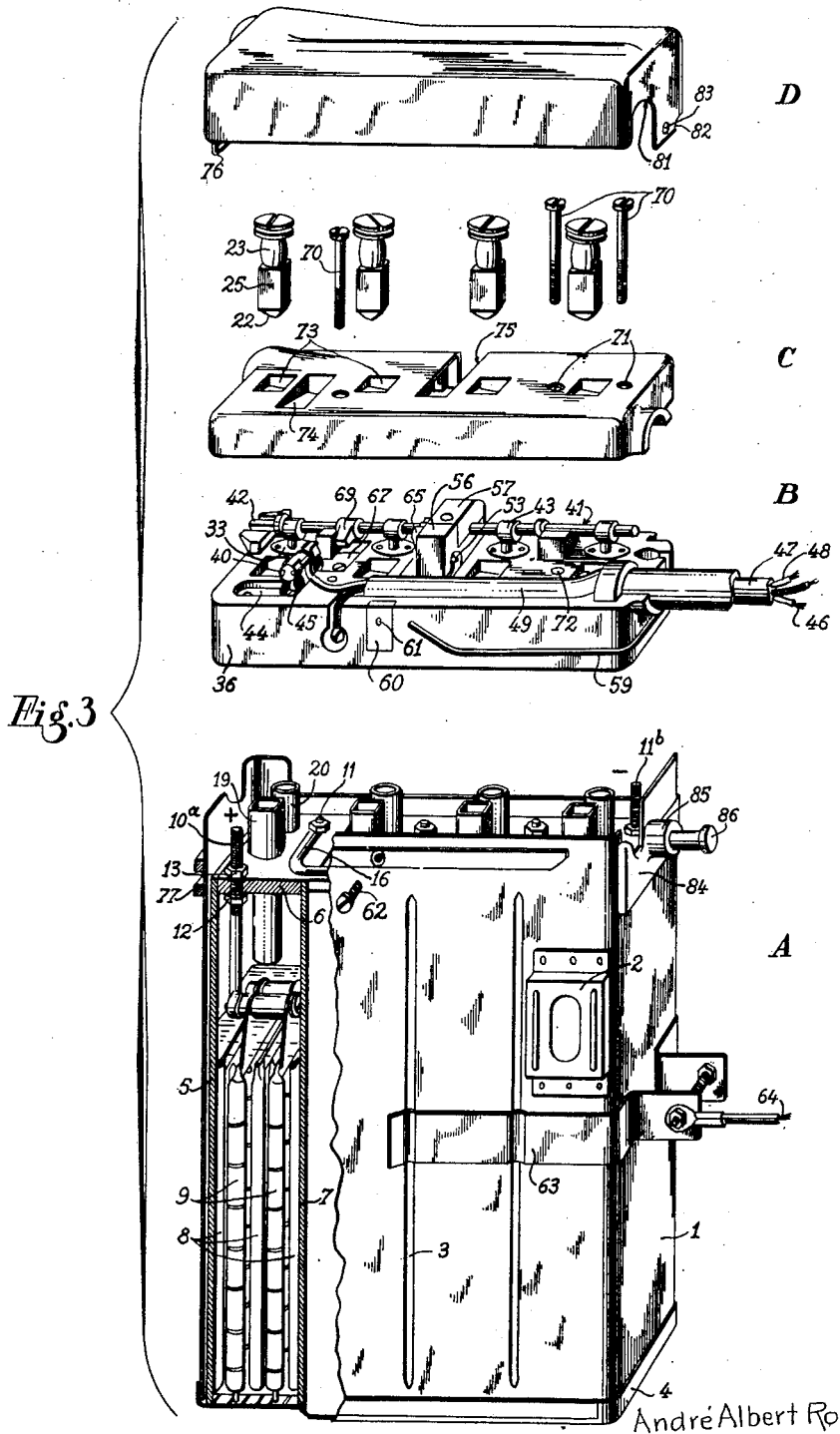

Patented Nov. 10, 1953

2,658,938

UNITED STATES PATENT OFFICE 2,658,938

ACCUMULATOR BATTERY

André Albert Robillard, Douai, France, assignor to Compagnie Auxiliaire des Mines, Douai, France, a French body corporate Application July 21, 1952, Serial No. 300,087

Claims priority, application France October 5, 1951

7 Claims. (Cl. 136—178)

1

The present invention relates to accumulator batteries adapted to be moved about in the course of their use and, in particular, to accumulator batteries for supplying electric current to miners' lamps. In such an application it is essential that the battery be perfectly sealed.

The present invention has for its object to provide an accumulator battery that completely meets this need. This battery is characterized in that it comprises in combination for each electrolyte compartment a perfectly fluid-tight stopper sealing the corresponding filler tube and an orifice with a closing valve for the free escape of the gases during charging, this valve being fluid-tight in a way to ensure a complete sealing of said gas escape orifice during utilization, i. e. the working periods of the battery.

According to another feature, a single external control device is provided that ensures simultaneously both the necessary switching for the charging or the discharging of the battery, and the opening or closing of the valve of each electrolyte compartment.

This single control device, ensuring the synchronism between the establishment of the charging and discharging circuits and the position of the valves, achieves an absolute safety in working, since said compartments are, in a definite manner, hermetically closed during the utilization of the apparatus, that is, during the discharging of the battery.

Other features will be apparent from the ensuing description.

In the accompanying drawing:

Figs. 1 and 2 are diagrammatic perspective views of an accumulator battery improved in accordance with the invention.

Fig. 3 is an exploded perspective view with a partial cut-away of the various constituent parts of the battery.

Figs. 4 and 5 are partial cross-sections of the battery in the region of one of the battery compartments, the top cover having been removed; these figures being for the charging and the discharging positions respectively.

Fig. 6 is a partial section showing the fixture of one of the rods forming a battery terminal in the cover of the electrolyte trough.

Fig. 7 is a perspective view showing the method of coupling the battery to the positive pole of an electric source for the charging of said battery.

Fig. 8 is a perspective view of the switch for the battery.

Figs. 9 and 10 are two circuit diagrams for the respective positions of battery discharge and charge.

In the illustrated embodiments, the accumulator battery in accordance with the invention is essentially composed of four parts A, B, C and D (see in particular Figs. 1 and 3, the latter showing an exploded view of these parts).

2

These parts are:

Part A, the case containing the accumulator battery unit.

Part B, the mechanism for the switch and the simultaneous control of the valves for the opening to the air of the various electrolyte compartments of the battery, and the support base for this mechanism.

Part C, an additional upper support element.

Part D, the accumulator battery cover.

Part A comprises an outer metal case 1 provided with external fittings 2 (Figs. 2 and 3) adapted to receive a belt or other means for, for example, securing the battery to the user.

The two large sides of the case also possess several longitudinal grooves 3 whose purpose will be subsequently described. This case is provided with a bottom 4, preferably separate, and is open at its upper end for the introduction of a trough 5 in an insulating material.

This trough 5 (Figs. 3, 4 and 5) is closed by a top piece 6 secured by means of glue or vulcanization in a way to ensure complete fluid-tightness. The trough is divided into several compartments by dividing plates 7 in an insulating material, and each compartment contains, as known, a certain number of positive plates 8 and negative plates 9 (Fig. 3) all these plates being immersed in the electrolyte. For each group of plates there are provided two output terminals, one positive 10 and the other negative 11. Each terminal is held in a fluid tight manner in the top piece 6, by two nuts 12 and 13 (Figs. 3 and 6) each of which is screwed on a threaded portion of the terminal and is provided with a circular edge 14 or 15 on the face adjacent the piece 6 that more or less penetrates the insulating material constituting this piece.

Each positive terminal 10 of each group of plates is connected to the negative terminal 11 of the adjacent group by a connecting bar 16 (Fig. 3). Thus, due to these connecting bars 16, the accumulator battery possesses on the top piece 6, a positive terminal 10$^a$ (Fig. 3) and a negative terminal 11$^b$.

In the region of each trough compartment, the piece 6 has two holes 17 and 18 (see Figs. 4 and 5) from which emerge two tubes 19 and 20 respectively.

The tube 19 has a polygonal cross-section, for example square, at least in the portion situated above the top piece 6, for the portion of this tube that passes through the top piece to which it is fixed may be relieved in the form of a circular cross-section to aid the fixing. This tube 19 constitutes the filling opening of the corresponding compartment of the battery. It is important that this tube be completely sealed after filling. To this end, the stopper comprises, as indicated in Figs. 3, 4 and 5, a threaded rod 21 having a head 22 adapted to slide without rotation in the polygonal portion of the tube 19, and an adjusting nut 23 that permits the tightening of a sleeve 25 in rubber or like material against this head, with the interposition of a support washer 24 between said nut and said sleeve. This sleeve 25 has in the free state such dimensions that it may be freely slipped onto the rod 21 the diameter of its bore being slightly greater than the diameter of the rod and, further, be slidable in the tube 19, the polygonal section of this sleeve being slightly less than the polygonal section of the bore of the tube 19.

Under these conditions, it is easy to introduce the stopper assembly in the tube 19; it then suffices to screw the nut 23 along the rod 21 to force the washer 24 towards the head 22 and thereby longitudinally compress the sleeve 25 and cause its radial expansion causing it to bear against the rod 21 and the bore of the tube 19 thus achieving a complete sealing of the corresponding compartment of the battery trough.

The tube 20 is tapped at its upper portion to receive a screwed ring 27 whose periphery is provided with one or several longitudinally disposed notches 28 providing an outlet for the gases issuing from the trough during the charging of the battery. Further, this piece 27 has an axial bore serving as a guide for the rod 29 of a valve. This rod carries on either side of a flange 30 two elements 31 and 32 constituting two valves.

The element 31 is adapted to cooperate with the upper end of the tube 20, this end forming a valve seat, whereas the element 32 is adapted to fit upward into the bottom of a recess in the stopper 33 screwed into a tapped hole 34 provided in the part B which will be subsequently described. A spring 35 urges the valve in a direction to separate the element 31 from the valve seat end of the tube 20.

The part B, which includes the device for the switching of the charging and discharging circuits and the operation of each of the above described valves, comprises a parallelepipedic block 36 in an insulating material. The plan shape of this block 36 is such that it exactly fits in the metal case 1 above the trough (5–6), the extended side walls of the case 1 fitting round the side of said block. This block rests on an insulating plate 36ᵃ (Figs. 4 and 5) which in turn rests on the trough and is held by means of nuts 37 on the rods 10 forming the battery terminals.

The block 36 comprises, then, in the region of each tube 20, the aforementioned tapped hole 34 in which is screwed the plug 33, through which the rod of valve 29 is extended. In the region of each tapped counterbore 34, the block 36 is provided with gas vents 39 (Figs. 4 and 5).

In line with each battery compartment and adjacent to the tapped hole 34, the block 36 of the part B is provided with a hole 40 to receive the filler tube 19, this tube being upwardly extended past the top of the block 36.

The aforementioned switch and valve control device comprises a rotative shaft 41, parallel to and above the block 36. This shaft is journalled in bearings partly formed in the block 36 and partly in the part C. The shaft 41 is terminated at one end by a prismatic portion 42 (Fig. 3) enabling it to be turned through an angle X (Fig. 9) between two positions, one corresponding to the discharging of the battery (Fig. 9) the other to its charging (Fig. 10). This shaft carries in line in the position of discharge, bears upon the valve with each valve, a cam 43 (Figs. 3, 4 and 5) which in the position of discharge, bears upon the valve rod 29 (Fig. 5) so that the element 31 is pressed against the end of the tube 20 thereby closing in a fluid-tight manner the battery trough. On the other hand in the charging position (Figs. 4 and 10) the cam 43 is withdrawn from the rod 29 and, under the action of the spring 35, the element 31 is separated from the tube 20, and the element 32 is applied against the plug 33 so that the gases given off during the charging, which pass from the bottom to the top of the tube 20, may pass through the grooves 28 in the guide 27 and the vents 39 out into the atmosphere. But gases cannot pass through the space between the upper end of the rod 35 of the valve and the corresponding hole in the stopper 33. Hence these gases, which are corrosive, cannot diffuse under the part C in that way harm the connecting elements disposed between the parts B and C.

The connecting elements enable two circuits to be obtained i. e. the charging and discharging circuits. Referring to Figs. 3, 9 and 10, and starting from terminal 10ᵃ, upon which the part B is secured by nut 30, this terminal 10ᵃ is connected to a metal strip 44 upon which is fixed a fuse 45. This fuse is directly connected to the conductor 46 (Figs. 3 and 10) of a cable 47 (Figs. 1, 2 and 3) that includes a further conductor 48. This cable 47 provided with an insulating sheath 49 is passed through the parts B and C of the battery between which it is embedded.

The conductor 46 and 48 are joined, outside the battery, to the device the battery is adapted to feed, for example a filament 50 (Figs. 9 and 10) of an electric bulb 51 of a lamp 52 (Figs. 1 and 2) adapted for instance to be attached to the miner's head wear.

The current passes through the aforementioned conductor 46 and returns through the conductor 48. The conductor 48 is connected to a stud 53 of a switch that also includes two other studs 54 and 55 (Figs. 9 and 10). The three studs 53, 54 and 55 are supported on a piece 56 (Figs. 3 and 8) in an insulating material fixed to the block B. The piece 56 forms with another piece 57 secured by screws 58, a central bearing for the shaft 41.

The stud 54 of the switch is connected by a conductor 59 to the negative terminal 11ᵇ of the battery, whereas the stud 55 is connected to an earthing plate 60 (Fig. 3) embedded in the block B. This plate is provided with a tapped hole 61 into which is screwed a screw 62 that passes through the metal wall of the case 1. In screwing this screw into the plate 60, the case 1 is earthed, as is in consequence, the terminal 55. This earthing may be achieved, as shown in Fig. 3, by a resilient strap 63 to which is connected a conductor 64 connected to earth. This strap is provided with fixing ribs adapted to fit into the grooves 3 in the metal case 1.

With the studs 53, 54 and 55 of the switch is combined a fork switch 65 (Figs. 8 to 10) fixed to a hub 66 in an insulating material which is so angularly keyed to the shaft 41 that the arms of the fork put into contact, either the two studs 53, 54, thereby closing the discharge circuit (Fig. 9), the cams 43 then holding the valves 31 on their seats (Fig. 5); or, the studs 54 and 55 thereby closing the charge circuit, the cams 43 being then in the position shown in Fig. 4 and allow the valves 31 to separate from the valve seats provided on the end of the tubes 20 under the action of springs 35.

The switch device is completed by a conductive plate 67 (Figs. 3, 9 and 10) connected by a connector 68 to the fuse 45. A finger contact 69 cooperates with this plate 67 and is keyed to the shaft 41 in such an angular position that it is in contact with the plate 67 for the angular position of the shaft 41 that corresponds to the charging of the accumulator (Fig. 10).

The part C is also constituted by a block in an insulating material of parallelepipedic shape similar in plan to that of the parts A and B. The block C is secured to the part B by means of screws 70 (Fig. 3) that pass through holes 71 in the block 36 and screw into tapped holes 72 in block B.

The block C is provided with as many holes 73 as the battery has compartments and filler tubes 19, these tubes being freely located in these holes 73 through which holes the plug nuts 23 for these tubes 19 may pass to permit their engagement in the latter. Each hole 73 is, then, in alignment with one of the holes 40 of the block 36 of the part B.

The block C is provided with another opening 74 to clear the fuse 45 and a notch 75 to clear the boss 56 and the attached piece 57 of the part B. On its under face, the block C is provided with various cored-out areas complementary to those of the block 36 and adapted to house the various devices carried by this block.

The part D, forming the cover, is metallic and is adapted, as shown in Figs. 1 and 2, to cover the parts B and C. This cover includes at one of its ends a downwardly extended portion in the shape of a ledge 76 (Fig. 3). This ledge is adapted to engage in a groove 77 provided in the corresponding outer wall of the case 1, and forms thereby a kind of hinge assembly that enables this cover to be swung up as shown in Fig. 1.

This side of the cover also includes an opening 78 (Figs. 2 and 7) for the introduction of a key 79 for use in rotating the shaft 41 between the two positions in Figs. 9 and 10. This key 79 is connected by a conductor 80 to the positive terminal of a source of charging current.

At the other end, the cover D includes a notch 81 for the passage of the conductor 47 and its sleeve 49, and, furthermore, at the side of this notch, a foot 82 provided with a hole 83. This foot 82 is adapted to fit between the corresponding wall of the case 1 and a fitting 84 (Fig. 3) attached to this wall. This fitting 84 is provided with a tapped boss 85, into which a screw 86 is screwed, said screw passing through the hole 83 of the foot 82 thereby locking the cover D in the closed position.

The accumulator battery functions in the following way. For the discharging of the battery in a feed circuit of, for example, the filament of a bulb 51 of the lamp 52, the shaft 41 occupies the angular position shown in Figs. 5 and 9. Under these conditions, the cams 43 of this shaft 41 bear against the rods 29 of the valves of the various compartments of the battery and the elements 21 of these valves are applied in a fluid-tight way against the upper ends of the gas escape tubes 20 so that the sealing of the trough containing the electrolyte is achieved.

Further, sealing is ensured at the open ends of the filler tubes 19, for cup-nuts 23 are screwed onto the rods 21 so as to cause the radial expansion of the elastic collars 25 each one of which is hermetically pressed against both the rod 21 and the internal prismatic wall of the tube 19.

The complete sealing of the trough is therefore achieved, and this is able to undergo sudden movements and even tipping over without any fear of the slightest escape of electrolyte.

Further, the fork 65 of the switch is in the position shown in Fig. 9 so that the closed discharge circuit of the battery follows the path shown in full line in Fig. 9, i. e. it passes from the positive pole 10$^a$ of the battery, through the plate 44, the fuse 45, the conductor 46, the filament 51, the conductor 48, the stud 53, the fork 65, the stud 54 and the conductor 59 connected to the negative pole 11$^b$ of the battery.

To charge, the battery is placed on a support and the spring clip 63, connected by the conductor 64 to, for example, the negative pole of an electric charging source, is clipped onto the metal case 1 of the battery, which is, through the medium of the screw 62 and the plate 60, in electrical contact with the stud 55. The positive pole of the electric charging source is connected by the conductor 80 (Fig. 7) to the hand key 79.

Thus, to charge the battery, the key 79 is introduced into the opening 78 of the cover D and the female end of this key fits over the prismatic end 42 of the shaft 41. In turning the key the shaft 41 is rotated and brought into the angular position shown in Figs. 4 and 10.

The cams 43 are thus thrown back (compare the positions in Figs. 4 and 5) and, under the action of springs 35, the rods 29 of the valves are raised, the element 31 of each valve is separated from the end of the corresponding tube 20 while the element 32 is applied against the under side of the plug 33, from this moment the gases produced during the charging are allowed to escape through notches 28 in each guide 27 and the vent 39 provided adjacent to each valve in the block C. Simultaneously, the fork 65 of the switch is put into contact with the studs 54 and 55 so that the charging circuit is then as follows (Fig. 10): conductor 80, key 79, shaft 41, shaft finger 69, plate 67, fuse 45, plate 44, battery positive pole 10$^a$, battery negative pole 11$^b$, conductor 59, stud 54, switch fork 65, stud 55, plate 60, screw 62, case 1, clip 63, conductor 64 and the negative pole of the electric charging source, this negative pole being, for example, the earthing.

Upon termination of the charging, the key 79 is brought back to its original position which causes the shaft 41 to return to the position of Figs. 5 and 9 (discharging circuit re-established) and the accumulator battery is once more ready for use.

It is obvious that this battery is absolutely safe to use, all sparks are under cover and the various components, and in particular the switch, are entirely enclosed in the cover D. It is particularly easy to employ, since the movement of a single member, i. e. the shaft 41, permits the battery to be charged or discharged while ensuring at the same time the automatic operation of the safety valves by means of which the trough is completely sealed while the battery is in use.

The invention is not limited to details of construction described and illustrated which have been given only by way of example. For instance, instead of a single trough 5, the battery may include as many troughs as there are compartments in the battery.

Having now described my invention what I claim as new and desire to secure by Letters Patent is:

1. In a portable accumulator battery, more particularly for use in mines, comprising a trough in an insulating material divided into several electrolyte compartments and a cover for this trough, in combination, for each electrolyte compartment: a filler tube in said cover, a plug that is completely fluid-tight for this filler tube, a gas outlet tube in said cover for the escape of gases to the atmosphere during the charging of the battery, in this outlet tube a valve that is fluid-tight for ensuring a complete hermetic sealing of said gas outlet tube during the periods of utilization of the battery i. e. the discharge of the battery, and a single control device for ensuring simultaneously the necessary switching for the charging or the discharging of the battery and the respective opening or closing of said valve for each of the electrolyte compartments, said single control device comprising a single rotative shaft, said rotative shaft including cams for actuating in the direction for closing the valves of said gas outlet tubes for the escape to the atmosphere of the gases from the electrolyte compartments, elastic devices being provided for actuating these valves in the direction of opening, and said shaft further including the mobile part of a switch device for the charging and the discharging of the battery.

2. Accumulator battery as claimed in claim 1, wherein above each gas outlet tube there is provided a guide for a rod forming part of said valve and this valve is provided with two sealing members, the first member being adapted to bear against the end of the gas outlet tube and the second member against said guide, the cam coacting with said valve carried by said rotative shaft being so adapted as to ensure the closing of the gas outlet tube by the application of the first member against said end of the gas outlet tube in opposition to the action of said elastic device which tends to separate said first member from this end and thereby put the corresponding compartment of the trough in communication with the atmosphere while it applies said second member against said guide.

3. Accumulator battery as claimed in claim 1, further comprising, an outer metal case in which is housed the trough, a positive terminal, a conductive member connected to this positive terminal, a negative terminal and a return circuit terminal, and said switch device adapted to connect the negative terminal either to the positive terminal for the charging of the battery or to the return circuit terminal for the discharging of the battery comprising three fixed studs connected respectively, one to said return circuit terminal, the second to said negative terminal and the third to said outer metal case, a fork keyed to the shaft of the single switch and control device for the valves for connecting up the stud connected to said negative terminal of the battery either with one or the other of the two other studs so as to establish the discharging circuit or the charging circuit of the battery, and a contact finger also keyed to said shaft so that for the charging position it comes into contact with said conductive member connected to the positive terminal of the battery.

4. Accumulator battery as claimed in claim 1, comprising from bottom to top four sections, the first of which sections includes an electrolyte trough in an insulating material and a metal box covering this trough, the second section including a block in an insulating material supporting the single switch and control device for the valves for the putting into communication with the atmosphere of the compartments of the electrolyte trough, the third section including a second block which forms the upper portions of bearings for the shaft of this device, and the fourth section including a cover which covers the whole of the two blocks and is connected to said metal box.

5. Accumulator battery as claimed in claim 4, wherein the shaft of the switch and control device for the valves comprises a prismatic end disposed inside said cover in front of an aperture therein which permits the introduction of a key for turning said shaft so as to bring it in one or the other of the positions for the charging or discharging of the battery and, further, to connect it to the positive terminal of the electric charging source.

6. Accumulator battery as claimed in claim 1, comprising from bottom to top four sections, the first of which includes an electrolyte trough in an insulating material and a metal box covering this trough, the second section including a block in an insulating material adapted to support the single switch and control device for the valves for putting the compartments of the trough into communication with the atmosphere, the third section including a second block that forms the upper portions of bearings for the shaft of this device, and the fourth section including a cover which covers the whole of the two blocks and is connected to said metal box, said cover being jointed to said box by means of a rib provided in this cover and engaged in a groove in the box and being locked to said box by the combination of a foot carried by said box and a screw which is screwed into this foot and penetrates in a hole in the cover.

7. In a portable accumulator battery more particularly for use in mines comprising a trough in an insulating material divided into several electrolyte compartments and a cover for this trough, in combination, for each electrolyte compartment: in said cover, a filler tube of polygonal section at least in the upper part thereof, a plug for said filler tube, said plug being composed of a screw having a polygonal head, a cap-nut screwed onto said screw and a collar in an elastic material of polygonal cross section having the same shape as that of said filler tube but slightly less than the inside section thereof in size when this collar is in the free state, said collar being disposed between said head and the cap-nut and being adapted to be radially compressed against the screw and against the inside wall of the filler tube by means of screwing the cap-nut onto the screw whereby said plug is completely fluid-tight for said filler tube, and said battery further comprising for each electrolyte compartment a gas outlet in said cover for the escape of gases to the atmosphere during the changing of the battery, and in said outlet tube a valve that is fluid-tight for ensuring a complete hermetic sealing of said outlet tube during the periods of battery utilizations, i. e. the discharge of the battery.

ANDRÉ ALBERT ROBILLARD.

References Cited in the file of this patent

UNITED STATES PATENTS

| Number | Name | Date |
|---|---|---|
| 1,756,072 | Smith | Apr. 29, 1930 |
| 2,592,207 | Stamper | Apr. 8, 1952 |

FOREIGN PATENTS

| Number | Country | Date |
|---|---|---|
| 78 of 1912 | Great Britain | Jan. 1, 1913 |